(12) United States Patent
Yang

(10) Patent No.: US 10,717,323 B2
(45) Date of Patent: Jul. 21, 2020

(54) SENSING PART, SENSING UNIT, WHEEL SPEED SENSING DEVICE AND VEHICLE

(71) Applicant: Robert Bosch GmbH, Stuttgart (DE)

(72) Inventor: Xin Yang, Suzhou (CN)

(73) Assignee: Robert Bosch GmbH, Stuttgart (DE)

(*) Notice: Subject to any disclaimer, the term of this patent is extended or adjusted under 35 U.S.C. 154(b) by 181 days.

(21) Appl. No.: 15/750,293

(22) PCT Filed: Jul. 28, 2016

(86) PCT No.: PCT/IB2016/054499
§ 371 (c)(1),
(2) Date: Feb. 5, 2018

(87) PCT Pub. No.: WO2017/021827
PCT Pub. Date: Feb. 9, 2017

(65) Prior Publication Data
US 2018/0229550 A1  Aug. 16, 2018

(30) Foreign Application Priority Data

Aug. 6, 2015 (CN) .................... 2015 2 0587321 U

(51) Int. Cl.
*B60B 27/00* (2006.01)
*B60T 8/171* (2006.01)
(Continued)

(52) U.S. Cl.
CPC .......... *B60B 27/0068* (2013.01); *B60T 8/171* (2013.01); *F16C 41/007* (2013.01);
(Continued)

(58) Field of Classification Search
CPC ....... B60B 27/0068; B60B 27/02; G01P 3/44; F16C 41/007; F16C 2326/02; B60T 8/171; B62K 2207/00; B62J 2099/002
See application file for complete search history.

(56) References Cited

U.S. PATENT DOCUMENTS 5,451,869 A * 9/1995 Alff ..................... G01P 3/443
324/173
5,902,065 A * 5/1999 Forestiero ................ G01P 1/00
384/448
(Continued)

FOREIGN PATENT DOCUMENTS

DE 102006033931 1/2008
DE 102012019505 4/2014
(Continued)

OTHER PUBLICATIONS

International Search Report for Application No. PCT/IB2016/054499 dated Nov. 2, 2016 (English Translation, 3 pages).

*Primary Examiner* — Freddie Kirkland, III
(74) *Attorney, Agent, or Firm* — Michael Best & Friedrich LLP

(57) ABSTRACT

A sensing part, a sensing unit, a wheel speed sensing device and a vehicle using said wheel speed sensing device. The vehicle comprises a vehicle wheel and the wheel speed sensing device. The wheel speed sensing device is mounted on the vehicle wheel for timely detecting a speed of the wheel. The sensing device comprises a magnetic-field generating unit and the sensing unit. The sensing unit comprises a fixed part and a sensing part detachably provided on the fixed part. A snapping slot and a snapping part, which can be elastically snapped with each other or released from each other, are provided between the sensing part and the fixed part. The sensing part comprises a housing and a sensing circuit board secured by the housing.

8 Claims, 3 Drawing Sheets

(51) Int. Cl.
*F16C 41/00* (2006.01)
*G01P 3/44* (2006.01)
*B60B 27/02* (2006.01)
*B62J 45/40* (2020.01)

(52) U.S. Cl.
CPC ............... *G01P 3/44* (2013.01); *B60B 27/02* (2013.01); *B62J 45/40* (2020.02); *F16C 2326/02* (2013.01)

(56) References Cited

U.S. PATENT DOCUMENTS

| | | | | |
|---|---|---|---|---|
| 6,792,650 | B2* | 9/2004 | Stagg | B60P 3/36 |
| | | | | 16/2.1 |
| 6,924,638 | B2* | 8/2005 | Muramatsu | B60B 27/00 |
| | | | | 324/174 |
| 7,198,407 | B2* | 4/2007 | Iiya | B60B 27/00 |
| | | | | 384/448 |
| 7,320,258 | B2* | 1/2008 | Tawara | G01P 3/443 |
| | | | | 324/174 |
| 7,445,388 | B2* | 11/2008 | Shigeoka | B60B 27/0005 |
| | | | | 324/173 |
| 8,123,410 | B2* | 2/2012 | Masuda | B60B 27/0005 |
| | | | | 384/448 |
| 2003/0047014 | A1* | 3/2003 | Stagg | B60P 3/36 |
| | | | | 73/866.5 |
| 2004/0108849 | A1* | 6/2004 | Muramatsu | B60B 27/00 |
| | | | | 324/174 |
| 2005/0185868 | A1* | 8/2005 | Iiya | B60B 27/00 |
| | | | | 384/448 |

FOREIGN PATENT DOCUMENTS

| | | |
|---|---|---|
| DE | 102013208314 | 11/2014 |
| JP | 2009255826 | 11/2009 |

* cited by examiner

SENSING PART, SENSING UNIT, WHEEL SPEED SENSING DEVICE AND VEHICLE

BACKGROUND OF THE INVENTION

The present application relates to a sensing part, a sensing unit, a wheel speed sensing device, and a vehicle in which the device is used.

When a vehicle is braked emergently, its wheels are prone to be locked due to a relative greater braking force. Therefore, more and more vehicles use an anti-lock braking device such that the security and operating capability of electric straddle vehicles can be improved and road accidents relating to them can be reduced.

A wheel speed sensor is provided in the anti-lock braking device to real-timely detect the speed of a wheel and transfer detected signals to an electronic control unit of the anti-lock braking device. The electronic control unit carries out logical judgment, analysis and computation of those detected signals. As soon as it is determined that the wheel has a tendency of being locked, a braking force applied to the wheel can be timely reduced such that the wheel can be prevented from being locked in braking, the vehicle can run stably with being braked, and any possible road accident can be avoided.

How to install the wheel speed sensor can directly affect the detecting accuracy of the wheel speed sensor. Take an electric straddle vehicle for example. As recorded in Japan Patent Application No. 2009255826A, in order to install a wheel speed sensor onto the electric straddle vehicle, the wheel speed sensor is first installed to a bracket which is then installed to a wheel hub of the vehicle. Therefore, when such a wheel speed sensor is installed, connecting it to the bracket is a necessary step, which renders the sensor's installing process more complicated, the production cycle longer and the manufacturing costs higher. Furthermore, when there is a failure, which is usually caused by only a sensing circuit board of the wheel speed sensor, in the wheel speed sensor, the entire wheel speed sensor must be detached and replaced by a new one. In this case, other non-faulty components of the old one are out of use, which results in unnecessary wastes.

SUMMARY OF THE INVENTION

It is an objective of the present application to overcome the shortcomings of the prior art and to propose a wheel speed sensing device, a sensing unit for the device, a sensing part for the device, and a vehicle in which said wheel speed sensing device is used, such that the device's configuration is simple and the device can be readily installed.

In order to achieve this objective, one aspect of the present application provides a sensing unit for a wheel speed sensing device installed on a vehicle's wheel to real-timely detect the wheel speed, wherein the sensing unit comprises a fixed part and a sensing part, the sensing part is detachably provided on the fixed part, and a snapping slot and a snapping part, which can be elastically snapped with each other or released from each other, are provided between the sensing part and the fixed part.

In another aspect, the present application provides a wheel speed sensing device installed on a vehicle's wheel for real-timely detecting the wheel speed, the wheel having a wheel hub and a screw rod passing through the wheel hub, the wheel speed sensing device comprising: a magnetic field generating unit secured on the wheel hub and capable of rotating as the wheel hub rotates, wherein the magnetic field generating unit comprises a magnetic field generating part extending in a direction substantially perpendicular to or parallel to a central axis of the wheel hub; and the sensing unit mentioned above.

In another aspect, the present application provides a vehicle comprising a vehicle wheel having a wheel hub and a screw rod passing through the wheel hub; and the wheel speed sensing device mentioned above.

In another aspect, the present application provides a sensing part for a sensing part of a wheel speed sensing device, comprising a housing and a sensing circuit board secured by the housing, wherein the sensing part can be elastically snapped into or released from a fixed part of the sensing unit.

For the sensing part, the sensing unit, the wheel speed sensing device and the vehicle using the sensing device according to the present application, because the snapping slot and the snapping part, which can be elastically snapped with each other or released from each other, are provided between the sensing part and the fixed part, the sensing part can be readily installed on or released from the fixed part, the wheel speed sensing device can be readily repaired if it has a failure, and it is convenient to provide different types of wheel speed sensing devices. Therefore, the wheel speed sensing device is simple in configuration, can be readily repaired and has good universality.

BRIEF DESCRIPTION OF THE DRAWINGS

The preceding and other aspects of the present application will be well understood and known due to the following detailed explanation with respect to the drawings, in which.

DETAILED DESCRIPTION

Figure 1:
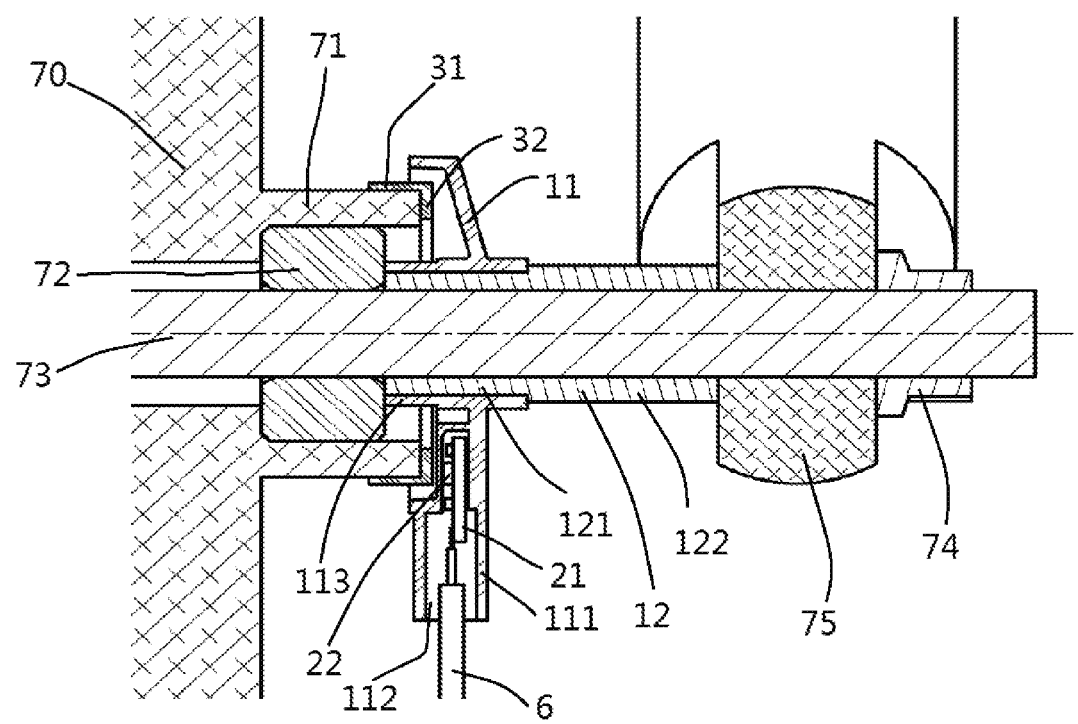
FIG. 1 schematically shows a cross-sectional view of a wheel hub of a vehicle, on which wheel hub a wheel speed sensing device according to one possible embodiment of the present application is installed.
Figure 2:
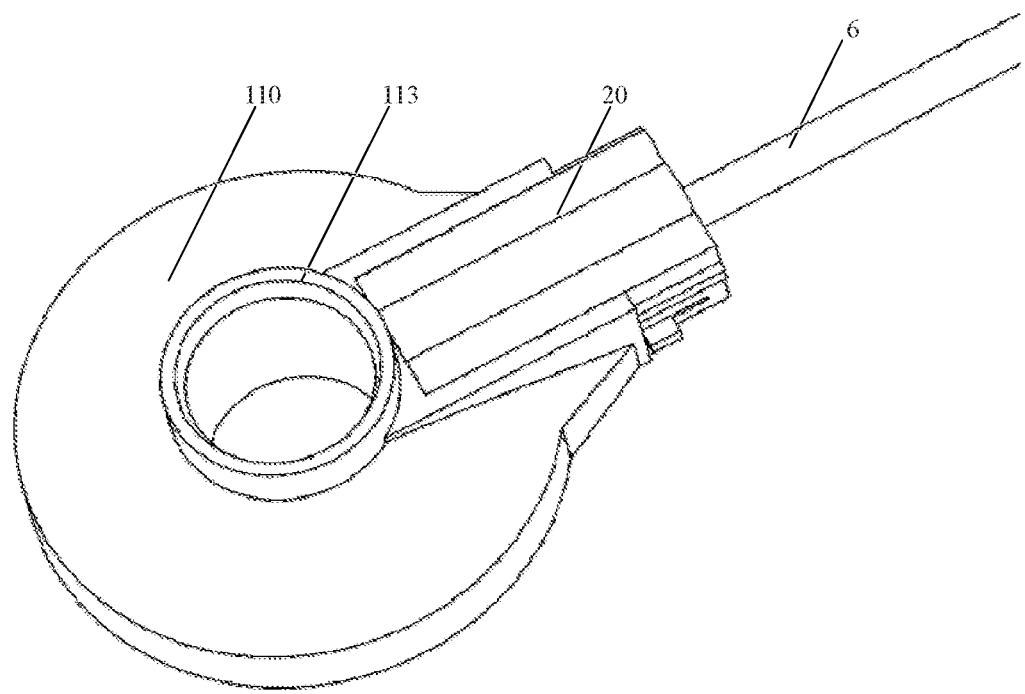
FIG. 2 schematically shows a perspective view of the wheel speed sensing device of FIG. 1.
Figure 3:
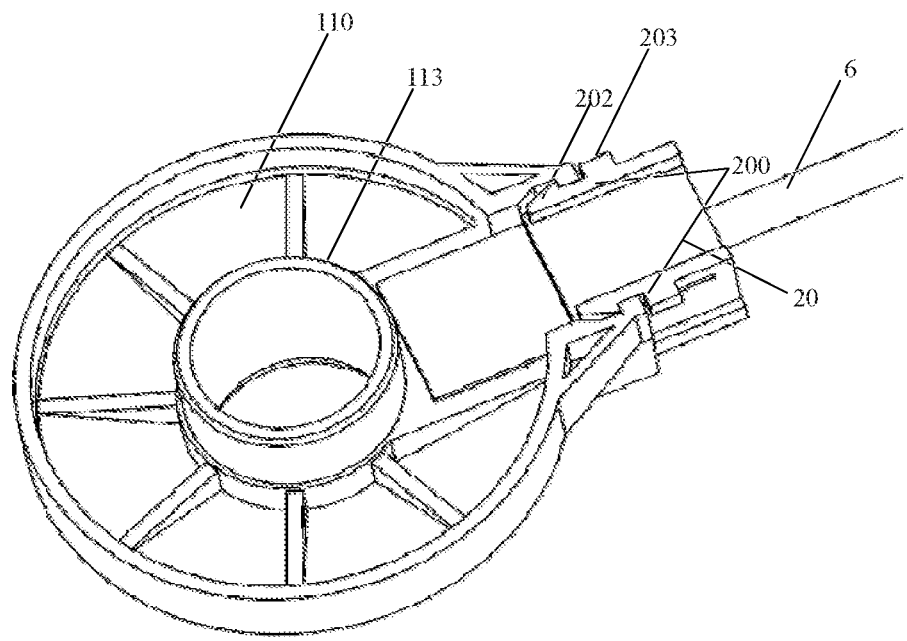
FIG. 3 schematically shows a perspective view of the wheel speed sensing device of FIG. 1, which is obtained in another view.
Figure 4:
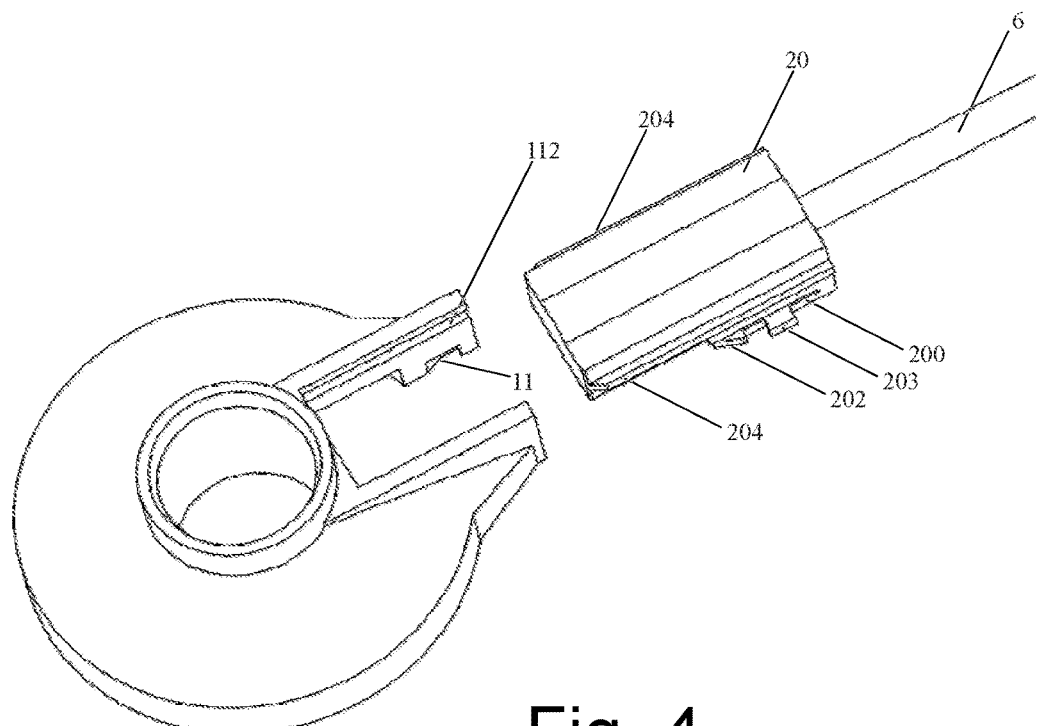
FIG. 4 schematically shows a partly exploded view of the wheel speed sensing device of FIG. 1.

A vehicle speed sensing device according to the present application will be explained now.

As shown in FIGS. 1 to 4, a wheel speed sensing device according to the present application is installed on a wheel of a vehicle to real-timely detect the wheel's speed. The wheel speed sensing device can be applied to a vehicle comprising a motor vehicle, a motorcycle, a motor tricycle, an electric bicycle, an electric motorcycle, an electric motor tricycle, an electric scooter or the like. The wheel of the vehicle comprises a wheel hub 70, a screw rod 73 passing through the wheel hub, a bearing 72 disposed between the wheel hub 70 and the screw rod 73, a shock absorber 75 secured on the screw rod 73, and a nut 74. The wheel hub 70 is provided with a boss 71. The bearing 72 is coaxially sleeved between the boss 71 and the screw rod 73 in such a way that the wheel hub 70 can be rotated about a central axis of the screw rod 73. The wheel speed sensing device comprises a sensing unit and a magnetic field generating unit. The sensing unit comprises a fixed part and a detachable sensing part 2.

The fixed part comprises a body portion 110 and a tubular portion. The body portion 110 is generally in the form of an umbrella. The tubular portion is provided so as to pass through the body portion 110, by which tubular portion the sensing unit can be secured on the screw rod 73. In an embodiment, the tubular portion is a separate sleeve 12, and the body portion 110 is provided with a joint tube 113 mating with the sleeve 12. The joint tube 113 is provided in a central part of the body portion 110 such that it passes through the body portion. The sleeve 12 is tightly sleeved on the screw rod 73 and comprises a joint end 121 and a boss end 122. There is an interference fit between the joint end 121 and the joint tube 113. The boss end 122 is used to bear against an end of the joint tube 113 such that the sleeve 12 can be tightly fitted to the body portion 110. After the sleeve 12 is sleeved on the screw rod 73, the body portion 110 is rotationally fixed or axially fixed relative to the sleeve 12 and the screw rod 73.

The tubular portion and the body portion 110 can be made of the same material or different materials. They can be manufactured separately. Alternatively, they can be formed as an integral component. In this embodiment, the tubular portion (i.e. the sleeve 12) and the body portion 110 each are molded by different materials. Then, they are assembled together. For example, the sleeve 12 is made of a metal material, the body portion 110 is made of a plastic material, and they can be assembled together or connected together by injection molding. In another embodiment, the tubular portion and the body portion 110 can be made of the same material, i.e. the same plastic material, and they are integrally molded such that an assembling step can be dispensed with. For instance, the tubular portion can be a joint tube 113 directly formed on the body portion 110, and the joint tube 113 is directly and tightly sleeved on the screw rod 73 such that the body portion 110 is rotationally fixed or axially fixed relative to the screw rod 73.

Figure 5:
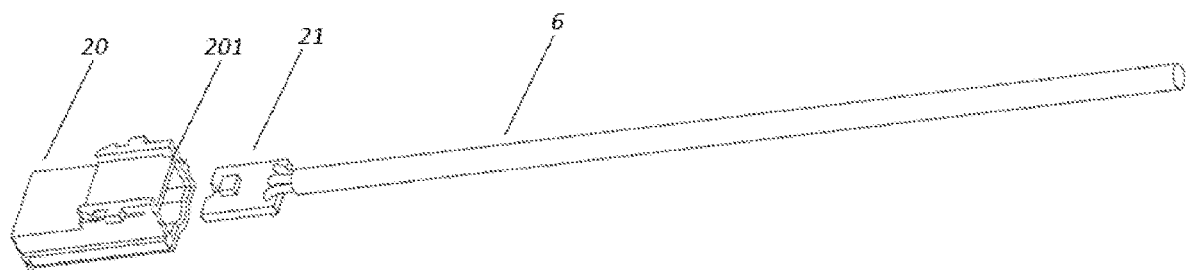
FIG. 5 schematically shows an exploded view of a sensing part of the wheel speed sensing device of FIG. 1.

As shown in FIG. 5, the sensing part 2 is modularly configured to comprise a housing 20 and a sensing circuit board 21. The sensing circuit board 21 can be secured in the housing 21. The sensing circuit board 21 extends in a direction substantially perpendicular to a central axis of the wheel hub 70. The sensing part 22 is provided on the sensing circuit board 21. That is to say, the sensing part 22 on the sensing circuit board 21 extends in a direction substantially perpendicular to the central axis of the wheel hub 70. The housing 20 extends from the body portion 110 substantially perpendicular to the central axis of the wheel hub to form a receiving socket 201. In an alternative embodiment, the housing 20 can extend from the body portion 110 substantially parallel to the central axis of the wheel hub to form the receiving socket 201. The sensing circuit board 21 can be secured in the receiving socket 201 of the housing 20 by insert molding, clamping, adhering, fixing with screw, or any other suitable manners.

A snapping slot and a snapping part, which can snap into or release from each other elastically, are provided between the housing 20 and the body portion 110. In this embodiment, a pair of snapping parts 202 are provided on the housing 20, and a pair of snapping slots 111 are opened in the body portion 110. After the snapping parts 202 of the housing 20 are pressed into the snapping slots 111 of the body portion 110 respectively, the sensing part 2 can be installed on the fixed part. Similarly, in an alternative embodiment, the snapping parts can be provided on the body portion 110 and the snapping slots can be opened in the housing 20 such that the sensing part 2 can be also installed on the fixed part. One of the housing 20 and the body portion 110 is provided with an elastic part on which the snapping part can be provided. In this embodiment, the elastic part is an elastic arm 200 with certain elasticity. The snapping part 202 is provided on the elastic arm 200. Pressing the elastic arm 200 enables the snapping part 202 to release from the snapping slot 111 such that the sensing part 2 is detached from the fixed part. Alternatively, the elastic part can be made in other forms as soon as the made elastic part enables the snapping part 202 to be snapped into or released from the snapping slot 111. For example, the elastic part can be a spring, and the snapping part 202 is provided on the spring. Optionally, one of the housing 20 and the body portion 110 is provided with a pressing part. In an embodiment of the present application, the elastic part and the pressing part are both provided on the housing 20. For instance, the pressing part 203 is provided on the elastic arm 200 according to the embodiment, by which pressing part the elastic arm 200 can be pressed to snap the snapping part 202 into the snapping slot 111 or release the former from the latter. In an alternative embodiment, the elastic part and the snapping part are provided on one of the housing 20 and the body portion 110, and the pressing part is provided on the other of the housing 20 and the body portion 110 such that a pressing force can be directly applied to the snapping part 202.

Optionally, an installation groove and an installation rib can be provided between the housing 20 and the body portion 110. In an embodiment, an installation rib 204 is provided on the housing 20, and an installation groove 112 is opened in the body portion 110. By pressing the installation rib 202 of the housing 20 into the installation groove 112 of the body portion 110, the sensing part 2 can be installed on the fixed part. Reversing this operation can enable the sensing part 2 to be detached from the fixed part. In an alternative embodiment, similarly, the installation rib can be provided in the body portion 110, and the installation groove can be opened in the housing 20 such that the sensing part 2 can be installed on the fixed part.

The snapping slot and the snapping part are at a side between the housing 20 and the body portion 110, and the installation groove and the installation rib are at the same side or an opposite side between the housing 20 and the body portion 110. For example, in an embodiment, the snapping slot 111 is provided at each of opposing sides of the body portion 110, and the installation groove 112 is also provided at each of the opposing sides of the body portion 110; the snapping part 202 is provided at each of opposing sides of the housing 20, and the installation rib 204 is also provided at each of the opposing sides of the housing 20. In an alternative embodiment, the snapping slots 111 are provided at opposing sides of the body portion 110, and the installation grooves 112 are provided at another opposing sides of the body portion 110; the snapping parts 202 are provided at opposing sides of the housing 20, and the installation ribs 204 are provided at another opposing sides of the housing 20.

Optionally, one or more snapping slots and one or more snapping parts can be provided between the housing 20 and the body portion 110; and one or more installation grooves and one or more installation ribs can be provided between the housing 20 and the body portion 110. In an alternative embodiment, the installation groove and rib can be dispensed with. For instance, in an embodiment, one snapping slot and one snapping part are provided at one side of the housing 20 and the body portion 110 respectively, and one or more installation grooves and one or more installation ribs are provided at the same side or the other side of the housing 20 and the body portion 110 respectively such that the sensing part 2 can be securely installed on the fixed part. For instance again, in an embodiment, two or more snapping slots and two or more snapping parts can be provided between the housing 20 and the body portion 110, and one or more installation slots and one or more installation ribs are provided between the housing 20 and the body portion 110 or alternatively the installation groove and rib can be dispensed with between the housing and the body portion.

The magnetic field generating unit comprises a surrounding part 31 securely installed on the wheel hub's boss 71, a carrying part 32 extending from the surrounding part 31 towards a central axis of the boss 71, and a magnetic field generating part (not shown). In this embodiment, the magnetic field generating part is provided on the carrying part 32. That is to say, the magnetic field generating part of the magnetic field unit is provided substantially perpendicular to the central axis of the wheel hub 70. After being assembled, the magnetic filed generating part is sleeved and covered by the body portion 110, and is opposite to the sensing circuit board 21 of the sensing part 2 such that the magnetic field generating part can be rotated relative to the sensing circuit board 21 and detected by the sensing circuit board 21.

The surrounding part 31 of the magnetic field generating unit extends axially along the wheel hub's boss 71. The surrounding part 31 is configured such that it is adapted to be tightly fitted to the wheel hub's boss 71 and thus the surrounding part 31 is rotationally fixed or axially fixed relative to the wheel hub's boss 71. The carrying part 32 with the magnetic field generating part extends radically along the wheel hub's boss 71 and tightly bears against an end face of the boss 71. Correspondingly, the sensing part 2 extends in a direction substantially perpendicular to the central axis of the hub 70 such that the sensing part 2 is close to and parallel to the magnetic field generating part. In an alternative embodiment, the magnetic field generating part is provided on the surrounding part 31 such that it extends axially along the wheel hub's boss 71. Correspondingly, in this case, the sensing part 2 extends in a direction substantially parallel to the central axis of the wheel hub 70.

As being assembled, the bearing 72 is coaxially sleeved between the boss 71 and the screw rod 73 such that the magnetic field generating unit can be secured on the boss 71 in a tight fit manner. The joint end 121 of the sleeve 12 is coaxially inserted in the joint tube 113 of the body portion 110 such that the sleeve 12 is tightly sleeved on the screw rod 73 in an interference fit manner. The shock absorber 75 is secured on the screw rod 73 such that the shock absorber 75 bears against a terminal of the boss end 122 of the sleeve 12. In this way, both ends of the sleeve 12 bear against the bearing 72 and the shock absorber 75 respectively such that the sleeve 12 is compressed and secured between the bearing 72 and the shock absorber 75. Using the nut 74 to fasten the sensing unit of the wheel speed sensing device renders the sensing unit non-rotatable or immovable. That is to say, in this way, the sensing circuit board 21 can be non-rotatable or immovable. However, the wheel hub 70 can be rotated through the bearing 72 to drive the magnetic field generating unit to rotate, that is to say, to drive the magnetic field generating part of the magnetic field generating unit to rotate. The sensing part 2 is formed by securing the sensing circuit board 21 in the receiving socket 201. The sensing part 2 can be installed on the fixed part by pressing the installation rib 202 of the housing 20 into the installation groove 111 of the body portion 110 in such a way that the sensing circuit board 21 is close to and parallel to the magnetic field generating part of the magnetic field generating unit. Through the above mentioned process, the sensing part 2 can be installed. Because the sensing part 2 is modularly configured and the snapping slot and the snapping part, which can be elastically snapped into or released from each other, are provided between the housing 20 of the sensing part 2 and the fixed part, such that it is easy to install the sensing part on or detach it from the fixed part. Therefore, the sensing part 2 can be installed or detached in any already mentioned step.

When the vehicle is running, the wheel hub 70 drives the magnetic field generating unit to rotate such that an alternating magnetic field is generated with the magnetic field generating unit rotating. The sensing part 22 of the non-rotatable sensing circuit board 21 is affected by the alternating magnetic field to produce an induced circuit. Therefore, the rotating speed of the magnetic field generating part can be known according to the induced current's variation, and thus the vehicle's running speed can be calculated out. The wheel speed sensing device according to the application comprises a transmission line 6 electrically connected to the sensing circuit board 21 to transmit detected signals from the wheel speed sensing device to the vehicle's electronic control unit.

When the wheel speed sensing device is out of order, only pressing the elastic arm 200 can release the snapping part 202 from the snapping slot 111 to detach the sensing part 2 from the fixed part. Then, a qualified sensing part or right type sensing part can be installed on the fixed part. Detaching or changing the fixed part or any other components expect for the sensing part 2 is not necessary, such that the faulty wheel speed sensing device can be readily repaired. Furthermore, when different types of sensing circuit boards 21 are assembled in the sensing part 2, different types of sensing parts can be obtained. Without changing the other components of the wheel speed sensing device, it is convenient to remodel the wheel speed sensing device to form different types of wheel speed sensing devices and have good universality.

Because the sensing part is modularly configured in the sensing unit, the wheel speed sensing device, and the vehicle using the sensing device according to the present application, the sensing part can be readily installed on or detached from the fixed part. It is convenient to repair a faulty wheel speed sensing device and to provide different types of wheel speed sensing devices. Therefore, the present wheel speed sensing device is simple in configuration, can be readily repaired and has good universality.

The invention claimed is:

1. A sensing unit for a wheel speed sensing device installed on a vehicle's wheel to real-timely detect the wheel speed, wherein the sensing unit comprises:
   a fixed part, wherein the fixed part comprises a body portion (110) and a sleeve (12), wherein the sleeve (12) is formed to be tightly sleeved on a screw rod (73) passing through a wheel hub (70) of the vehicle's wheel to secure the sensing unit on the screw rod (73), and wherein the body portion (110) and the sleeve (12) are formed as an integral component or are assembled together;
   and a sensing part (2), wherein the sensing part comprises a housing (20) and a sensing circuit board (21) secured in the housing;
   wherein a snapping part (202) is provided in one of the housing (20) and the body portion (110) and a snapping slot (111) is provided in the other of the housing (20)

and the body portion (110), wherein the snapping slot (111) and the snapping part (202) can be elastically snapped into or released from each other, so that the sensing part (2) is detachably provided on the fixed part.

2. The sensing unit for the wheel speed sensing device as claimed in claim 1, wherein one of the housing (20) and the body portion (110) is further provided with an elastic part (200) on which the snapping part (202) is provided.

3. The sensing unit for the wheel speed sensing device as claimed in claim 1, wherein one of the housing (20) and the body portion (110) is further provided with a pressing part (203), the elastic part (200) together with the pressing part (203) is provided in said one of the housing (20) and the body portion (110), or alternatively the elastic part (200) and the snapping part (202) are provided in one of the housing (20) and the body portion (110), and the pressing part (203) is provided in the other of the housing (20) and the body portion (110).

4. The sensing unit for the wheel speed sensing device as claimed in claim 1, wherein an installation groove (112) and an installation rib (204) matable with the installation groove is provided between the housing (20) and the body portion (110), the installation rib (204) is provided in one of the housing (20) and the body portion (110), and the installation groove (112) is provided in the other of the housing (20) and the body portion (110).

5. The sensing unit for the wheel speed sensing device as claimed in claim 4, wherein one or more snapping slots and one or more snapping parts can be provided between the housing (20) and the body portion (110), one or more installation grooves and one or more installation ribs can be provided between the housing (20) and the body portion (110) or alternatively the installation groove and the installation rib can be dispensed with.

6. The sensing unit for the wheel speed sensing device as claimed in claim 4, wherein the snapping slot (111) and the snapping part (202) are provided at one side between the housing (20) and the body portion (110), and the installation groove (112) and the installation rib (204) are provided at said one side or the other side between the housing (20) and the body portion (110).

7. A wheel speed sensing device installed on a wheel of a vehicle for real-timely detecting the wheel speed, the wheel having a wheel hub (70) and a screw rod (73) passing through the wheel hub, the wheel speed sensing device comprising:
- a magnetic field generating unit secured on the wheel hub (70) and capable of rotating as the wheel hub rotates, wherein the magnetic field generating unit comprises a magnetic field generating part extending in a direction substantially perpendicular to or parallel to a central axis of the wheel hub; and
- a sensing unit as claimed in claim 1.

8. A vehicle, comprising:
- the vehicle wheel having the wheel hub (70) and the screw rod (73) passing through the wheel hub; and
- the wheel speed sensing device as claimed in claim 7.

\* \* \* \* \*